Patented Apr. 10, 1951

2,548,438

UNITED STATES PATENT OFFICE 2,548,438

MULTICELLULAR ACRYLIC RESIN

Joseph R. McLoughlin, Fort Washington, Pa., assignor to Rohm & Haas Company, Philadelphia, Pa., a corporation of Delaware No Drawing. Application November 24, 1948, Serial No. 61,933

4 Claims. (Cl. 260—2.5)

This invention relates to cellular, polymeric, acrylic resins of low apparent density. With greater particularity, this invention concerns objects composed of acrylic resins which contain a multiplicity of small gas cells or voids about which the acrylic resin provides a thin sheath forming a relatively continuous skeletal structure.

It has heretofore been proposed to prepare porous or sponge-like products from resinous materials. These products have been formed by introducing gas into a solution of a soluble resin to form a froth which is then thermoset, by forcing gas under high pressure into a plastic material and causing it to expand within this material upon release of pressure, or by adding a "blowing agent" in the form of a liquid or solid and utilizing such agent under conditions in which it volatilizes or decomposes to form a gas. Volatile liquids or solvents, such as water, alcohol, or gasoline, and solids, such as sodium bicarbonate or ammonium nitrite, are typical of the so-called blowing agents. Where rubbery products are being processed, the known methods of blowing have been more or less successful. These methods have not, however, been successfully applied for the formation of relatively strong, rigid, cellular plastics. Objects of the prior art have not been self-supporting, or have lacked rigidity and strength, or have not been capable of being worked or fabricated into definite types of structures without serious loss in properties or even collapse of the cellular structure.

An object of this invention is the provision of cellular acrylic resins of low apparent density. Another object is the provision of cellular resinous objects which are relatively rigid and self-supporting. A further object is the provision of a cellular resinous material which can be worked and fabricated into various desired shapes without loss of essential properties.

These objects as well as other objects which will become evident below are accomplished by our invention. According to the process of our invention, acrylic esters yielding solid polymers are mixed with 6% to 10% of their weight of an organic peroxide which is decomposed when heated in boiling toluene, the resulting mixture is polymerized at 0° C. to 40° C. until a solid polymer results, and this polymer is heated at 110° C. to 130° C. until a light cellular structure has been formed. The structure is then cooled.

The final product comprises the acrylic resin in the form of a continuous sheathing of such resin about a multiplicity of small bubbles. The apparent density of the expanded polymer is less than about eight pounds per cubic foot. With some variations in procedure apparent densities have been obtained as low as two pounds per cubic foot.

To form the acrylic resin, there may be used any of the acrylic esters or mixtures thereof with each other or with other ethenoids, polymerizable monovinylidene compounds, which yield polymers which are firm and hard at room temperature but which soften above about 70° C. Foremost of these is methyl methacrylate and copolymers thereof with ethyl acrylate, ethyl methacrylate, butyl methacrylate or acrylonitrile. There may also be used copolymers of acrylic esters and styrene, vinyl acetate, or the like. Other acrylic esters and copolymers may, however, be used, those named above being but typical. The material to be polymerized may contain, if desired, some previously formed polymer dissolved in monomeric material. This procedure may prove advantageous when objects of relatively thick cross-section are being formed, because the heat evolved is somewhat less and can be more readily dissipated.

As peroxide, there may be used any organic peroxide which decomposes when boiled in toluene. Typical of such compounds are acetyl benzoyl peroxide, caproyl peroxide, lauroyl peroxide, benzoyl peroxide, tert.-butyl perbenzoate, etc. These are effective polymerization catalysts at 0° to 40° C. Yet at temperature at which the acrylic resins become soft, pliable, and capable of being formed and shaped, at the concentrations used they develop gas from many centers and cause the normally solid polymer to be expanded by a multiplicity of fine bubbles. Since the gas in these bubbles has been analyzed and found to contain considerable carbon dioxide, there is more involved here than mere decomposition of the peroxides.

The concentration of catalyst should be relatively high with reference to previously practiced procedures. The monomer may be saturated with an organic peroxide at room temperature or below when lower temperatures are utilized for polymerization. In general, concentrations of 6% to 10% are preferred, based on the weight of material to be polymerized. In the choice of catalyst, it is, of course, necessary to choose a peroxide soluble to this extent at the temperature of polymerization.

The polymerization with a high concentration of organic peroxide is accomplished at relatively low temperatures. Such temperatures require relatively long periods of time for effective polymerization. At 40° C. a sheet which is a quarter-inch in thickness may require as much as six hours. As sheets or other objects are made thicker, it becomes more and more important to control the temperature during polymerization. This may be done by removing heat of polymerization with a cooling medium and by working at relatively low temperatures, at which polymerization occurs quite slowly. With objects which are two to three inches in thickness, it becomes desirable to work at 0° C. to 15° C., to cool with a circulating liquid about the mold or form, and to allow even several weeks for polymerization.

Further details of preparing the low density products of this invention are given in the following example.

A mixture of 92 parts of methyl methacrylate and 8 parts of benzoyl peroxide was made and the peroxide dissolved in the ester by gentle warming. The mixture was then run into a glass-walled mold of flat sheets one-fourth inch apart, lined with cellophane, and placed in a circulating air-bath at room temperature (about 25° C.). During the course of about six hours a gel formed which was removed from the mold. The product was a slightly hazy sheet which could readily be handled without danger of being broken.

It was placed in an oven at 120° C. for 45 minutes. The sheet rapidly expanded to 21 times its original dimensions. It was cooled to a hard, cellular slab of considerable rigidity. It could be readily cut by sawing and could be bent and shaped when heated to about 100° C.–110° C. It had a density of seven pounds per cubic foot. It had about the same insulating value as cork.

In the case of methyl methacrylate polymers the optimum temperature for expansion occurs from about 120° C. to about 130° C. When expansion is accomplished at atmospheric pressure, the apparent dimensions of an object of polymeric material are more than doubled. Blocks are readily thus prepared with densities of about seven pounds per cubic foot. When partially expanded blocks are subjected to reduced pressure, densities as low as two pounds per cubic foot may be obtained. This results primarily from an increase in the size of the bubbles.

The gas-expanded polymers of this invention remain thermoplastic and may be worked in a number of ways to give many types of structures. For instance, a sheet of solid polymer may be expanded in a form or mold of such dimensions that the expanded polymer would more than fill it. This gives smooth, plane surfaces. On the other hand, a sheet expanded without such a mold may be lightly pressed with hot plates to give smooth surfaces which are of somewhat greater density than the bulk of the sheet. Again, an expanded sheet may be used as a core in a laminated structure. Typical of such structures is one made by coating an expanded sheet with a solution of a soluble phenol-formaldehyde resin and applying a solution of an acrylic polymer, such as ethyl acrylate in ethylene dichloride, to aluminum sheets, which are pressed to the expanded sheet. There is thus formed a light, strong, rigid composite structure useful for architectural purposes. It possesses high thermal and acoustic insulating properties. Again, an expanded sheet may be shaped by being locally heated to forming temperatures and bent or shaped. One useful product which may thus be formed is a duct. The flat, expanded sheet may be heated at suitable intervals with triangular metal bars and bent to give rectangular or square tubes. Again, the expanded sheets while in a plastic stage may be bent about forms or molds to give desired shapes, such as sound tubes.

I claim:

1. The process of preparing objects of hard acrylic resin having therein a multiplicity of small gas cells surrounded by said resin in the form of a continuous skeletal structure which comprises mixing an acrylic ester which yields hard, solid polymers and an organic peroxide which decomposes when boiled in toluene, the amount of peroxide being 6% to 10% of the weight of said ester, polymerizing said ester at 0° C. to 40° C. in the presence of said peroxide until a polymeric solid is formed, and heating the resulting polymeric solid at 110° C. to 130° C. to form a porous structure.

2. The process of preparing a polymeric methyl methacrylate in the form of a light porous solid in which small gas cells are surrounded by a skeletal structure of said polymeric material which comprises mixing methyl methacrylate and an organic peroxide which decomposes when boiled in toluene, the amount of peroxide being 6% to 10% of the weight of the said methacrylate, polymerizing said methacrylate at 0° C. to 40° C. in the presence of said peroxide until a polymeric solid is formed, and heating the polymeric solid at 110° C. to 130° C. to form a light cellular solid.

3. The process of claim 2 in which the peroxide is benzoyl peroxide.

4. The process of claim 2 wherein the heating of the polymeric solid is performed under reduced pressure.

JOSEPH R. McLOUGHLIN.

REFERENCES CITED

The following references are of record in the file of this patent:

UNITED STATES PATENTS

| Number | Name | Date |
| --- | --- | --- |
| 2,045,651 | Hill | June 30, 1936 |
| 2,299,593 | Roberts et al. | Oct. 20, 1942 |